(12) United States Patent
Phillips et al.

(10) Patent No.: US 7,452,620 B2
(45) Date of Patent: Nov. 18, 2008

(54) IONIC CONDUCTION DEVICE

(75) Inventors: Robert John Phillips, Devon (GB); Adrian Simons, Somerset (GB)

(73) Assignee: Honeywell Normalair - Garrett (Holdings) Limited, Yeovil, Somerset (GB)

(*) Notice: Subject to any disclaimer, the term of this patent is extended or adjusted under 35 U.S.C. 154(b) by 363 days.

(21) Appl. No.: 10/884,458

(22) Filed: Jul. 2, 2004

(65) Prior Publication Data
US 2005/0008913 A1    Jan. 13, 2005

(30) Foreign Application Priority Data
Jul. 4, 2003   (GB) .................................. 0315686.6

(51) Int. Cl.
*H01M 8/04* (2006.01)
(52) U.S. Cl. ......................................... 429/26; 204/256
(58) Field of Classification Search ................. 204/256, 204/258; 429/12, 34, 36, 38, 30, 33, 26
See application file for complete search history.

(56) References Cited

U.S. PATENT DOCUMENTS 6,203,676 B1 * 3/2001 Phillips et al. .............. 204/256
6,858,338 B2 * 2/2005 Sugiura et al. ................ 429/32
7,118,820 B2 * 10/2006 Nuttall et al. ................. 429/26
2003/0068542 A1 * 4/2003 Harada et al. ................. 429/34

FOREIGN PATENT DOCUMENTS

| | | |
|---|---|---|
| DE | 4016157 | 12/1990 |
| EP | 0501401 | 9/1992 |
| EP | 0726226 | 8/1996 |
| EP | 0950431 | 10/1999 |

* cited by examiner

*Primary Examiner*—Patrick Ryan
*Assistant Examiner*—Monique Wills
(74) *Attorney, Agent, or Firm*—MacMillan, Sobanski & Todd, LLC

(57) ABSTRACT

An ionic conduction device of the kind including a tri-layer including an electrolytic membrane having a pair of opposed surfaces, and a gas permeable electrode in contact with each opposed surface. The device has a first gas flow path for a first gas across one of the opposed surfaces, and second gas flow path for a second gas across the one of the opposed surfaces, and a third gas flow path for a third gas along the other of the opposed surfaces of the membrane. The device includes a fourth flow path through the device for a heat exchanging fluid. The fourth flow path bringing the heat exchanging fluid into heat exchange relationship with the tri-layer.

7 Claims, 3 Drawing Sheets

IONIC CONDUCTION DEVICE

CROSS-REFERENCE TO RELATED APPLICATIONS

Priority is claimed to United Kingdom patent application Serial No. 0315686.6 filed Jul. 4, 2003.

STATEMENT REGARDING FEDERALLY SPONSORED RESEARCH OR DEVELOPMENT

Not Applicable.

TECHNICAL FIELD

This invention relates to an ionic conduction device of the kind having a so-called tri-layer being a membrane of a suitable electrolytic material having a pair of opposed surfaces, and a gas permeable electrode in contact with each opposed surface.

BACKGROUND OF THE INVENTION

Examples of such devices are described in our previous patent applications EP-A-0726226 and EP-A-0950431.

In each example, across one of the opposed surfaces of the membrane, air is passed along a flow path, while a current is applied across the tri-layer, and oxygen passes through the membrane to a gas flow path at the other of the opposed membrane surfaces, whilst oxygen depleted air, which is rich in nitrogen, passes along the one opposed surface, and hence from the device.

In EP-0726226, a cross flow device is described, with air being fed across the one opposed membrane surface from a first side of the device, and the oxygen depleted gas passing to an opposite second side of the device, whilst the oxygen flows crosswise across the other opposed surface of the membrane to a third side of the device intermediate the first and second sides.

In EP-A-0950431, gas flow paths are provided through a stack of the tri-layers, in flow paths which include passages which extend through the tri-layers.

Such ionic conduction devices may be used alternatively as fuel cells, with a fuel gas such as hydrogen, being combined with oxygen along one opposed surface of the membrane, and exhaust gas being collected from the other opposed surface of the membrane, the device generating electrical energy across the tri-layer.

Particularly where the ionic conduction device is used to separate gases from a gas mixture, e.g. oxygen from air, such devices tend to operate inefficiently. This is because it is difficult to maintain a thermal equilibrium in the device as at least after a warm-up period, as electrical energy supplied is converted into heat which must be removed. Conventionally, the airflow to the device is optimized to achieve a thermal equilibrium, but this results in the oxygen depleted gas still containing significant volumes of oxygen, as the airflow is too great for all the oxygen to pass through the membrane as the air flows. If the airflow is reduced, more oxygen is separated from the air, but the device may become overheated.

It is particularly important where it is desired for the oxygen depleted air to be used, for example as an inert gas in an aircraft for example, in the aircraft's fuel tanks to reduce any risk of fire/explosion, for the oxygen depleted gas to have as low as possible an oxygen content.

BRIEF SUMMARY OF THE INVENTION

According to the invention we provide an ionic conduction device of the kind including a tri-layer including an electrolytic membrane having a pair of opposed surfaces, and a gas permeable electrode in contact with each opposed surface. The device having a first gas flow path for a first gas across one of the opposed surfaces, and second gas flow path across the one of the opposed surfaces, and a third gas flow path for a third gas across the other of the opposed surfaces of the membrane, characterized in that the device includes a fourth flow path through the device for a heat exchanging fluid, the fourth flow path bringing the heat exchanging fluid into heat exchange relationship with the tri-layer.

By virtue of the present invention, where applied to a device for separating gases from a gas mixture, e.g. air into oxygen and oxygen depleted gas, the flow of air into the device may be slowed to achieve most efficient gas separation, whilst heating and/or cooling may be effected by the flow of heat exchanging fluid to maintain thermal equilibrium throughout the device.

Desirably the fourth flow path is separate from the first, second and third gas flow paths but where the third gas may be diluted by the fourth fluid, if desired, the fourth flow path for the heat exchanging fluid may be coincident with the third gas flow path.

In the case of a device being used as a fuel cell, the heat exchanging fluid may be used to heat/cool the device as required to achieve thermal equilibrium through the device to maximize electrical energy generation.

Thus in one example, where the device is for separating gases from a gas mixture, the first gas may be air and the second gas oxygen depleted air, and the third gas may be oxygen. Thus first gas, e.g., air, may flow from an inlet to the device to the first gas flow path, whilst the second gas, e.g. oxygen depleted air, may flow from the second gas flow path to a first outlet of the device, and the third gas, e.g. oxygen, may flow from the third gas flow path to a second outlet of the device. Thus the first and second flow paths may be connected at the one of the opposed surfaces of the membrane.

In another example, where the device is for use as a fuel cell, the first gas may be a fuel gas such as hydrogen, the second gas may be oxygen, and the third gas an exhaust gas. Thus the first gas, e.g. hydrogen, may flow from a first inlet to the device to the first gas flow path, whilst the second gas, e.g. oxygen gas, may flow to the second gas flow path from a second inlet to the device. whilst the third gas, e.g. exhaust gas, may flow from the third flow path to an outlet of the device. Again therefore, the first and second flow paths may be connected at the one of the opposed surfaces of the membrane.

In each case, the heat exchanging fluid may flow though the device from a heat exchanging fluid inlet, to a heat exchanging fluid outlet.

In one embodiment, the inlet or inlets and outlet or outlets of the device are located at respective sides of the device, where respective plenums may be provided to deliver and collect the respective gases for flow across the opposed surfaces of the membrane, and the heat exchanging fluid for flow in passages alongside at least one of the first, second and third gases. Thus the device may be of the same general form as the device described in our previous patent application EP-A-0726226 but with the heat exchanging flow path of the invention, in addition.

In a second embodiment, the inlet or inlets and outlet or outlets of the device are located at one or each of the ends of the device, where ports may be provided through which the gases flow and the heat exchanging fluid passes. and the fourth flow path may be provided by a labyrinth of passages across at least one of the opposed surfaces of the membrane of the tri-layer In each case, the ionic conduction device may include a plurality of tri-layers separated by respective interconnects, and the passages for the flow of heat exchanging fluid may be provided by the configurations of the interconnects which may permit the heat exchanging fluid to exchange heat to or from each of the tri-layers.

BRIEF DESCRIPTION OF THE DRAWINGS

Embodiments, of the invention will now be described by way of example, with reference to the accompanying drawings in which.

DETAILED DESCRIPTION OF THE INVENTION

Figure 1:
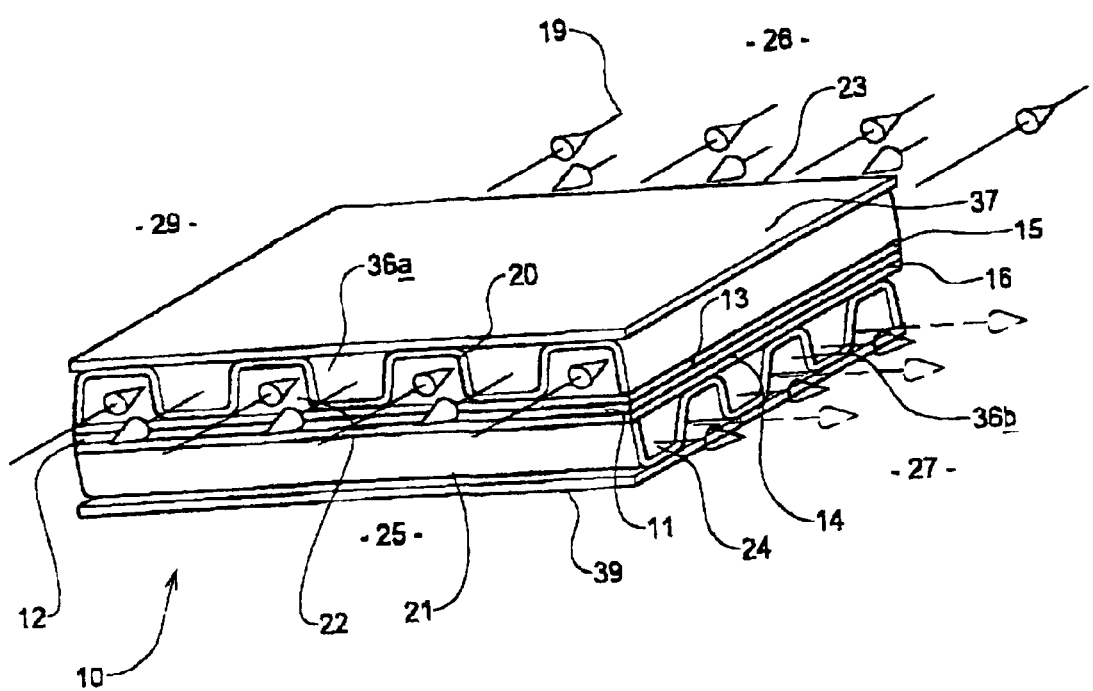
FIG. 1 is an illustrative view through a part of a first embodiment of an ionic conduction device in accordance with the invention.

Referring to FIG. 1, an ionic conduction device 10 for separating gases from a gas mixture, and more particularly oxygen from air, includes a tri-layer construction 11 which includes a membrane 12 of a suitable electrolytic material such as for example only, Cerium Gadolinium Oxide. The membrane 12 has a pair of opposed surfaces 13, 14, each of which is in contact with a respective electrode 15, 16. The electrodes 15, 16 arc gas porous and are electrically connected in a circuit whereby an electrical potential of typically 100V, may be established across the membrane 12. The electrodes 15, 16 may be made of Lanthanum Strontium Cobalt Ferrite or another suitable material.

In practice a stack of tri-layers 11 may be provided, with the tri-layers 11 being separated by interconnects 20, 21 one at either side of each of the tri-layers 11. The interconnects 20, 21 serve not only to space the tri-layers 11 apart to establish gas flow paths as will be described below, but also provide electrical continuity throughout the device 10. The interconnects 20, 21 may be made of, for example only, Haynes alloy 230, or another suitable material.

In the example of FIG. 1, a first gas flow path 22 is provided across one of the opposed membrane surfaces 13 for air, from inlets at a first side 25 of the device 10 where a plenum may be provided (not shown), to which a supply of air may be provided. The interconnect 20 in this example is of sinusoidal configuration, and multiple passageways of the first flow path 22 are provided between the interconnect 20 and the gas porous electrode 15. As the air flows across the tri-layer 11, along the one surface 13 of the membrane 12, oxygen passes through the membrane 12 and to a third gas flow path 24 provided by passageways between the sinusoidal interconnect 21 at the other opposed surface 14 of the membrane 12, to a third 27 side of the device 10.

The oxygen depleted air continues to flow through the passageways across the surface 13 of the membrane 12, the passageways then providing a second flow path 23 to outlets at the opposite second side 26 of the device, to the side 25 where the air entered the device 10. At the opposite second side 26, another plenum may be provided to collect the oxygen depleted gas 19, e.g. for delivery for use or exhaustion.

Desirably, in accordance with the invention, the oxygen depleted gas 19 is substantially oxygen free, and thus the oxygen depleted gas may be used as an inert atmosphere, for example in a fuel tank of an aircraft or other vehicle Thus the device 10 is a so called cross flow device 10, in which the first and second gases (air and oxygen depleted gas) flow in one direction across the one of the opposed surfaces 13, 14, from the first side 25 to the opposite second side 26, whilst the third gas, (oxygen) flows across the membrane 12 transversely of the first and second gases, to the third side 27 of the device 10, typically normally to the flows of the first and second gases.

In use, the device 10 will attain high temperatures, at least after an initial warn up period, of typically in the order of 960□C. To maintain the thermal equilibrium of the device 10, as the electrical energy in the device 10 is converted to heat energy, a flow of a heat exchanging fluid, which may be liquid or gas, is established through the device 10, in passages 36a, 36b provided between the interconnects 20, 21 and respective end covers 37, 39 shown in FIG. 1, but possibly between adjacent interconnects 20, 21 where~plurality of tri-layers each having a pair of interconnects 20, 21 are arranged in a stack. The flowing heat exchanging fluid, by passing through the device 10, is in heat exchange relationship with the tri-layer 11 or layers 11.

The heat exchanging fluid flows from inlets at the second side 26 of the device 10 to the first side 25 opposite of the device 10 where a yet further plenum (not shown) may be provided to collect the heat exchanging fluid, in passages provided between the sinusoidal first interconnect 20 and the upper (as shown) cover 37. Thus the heat exchanging fluid at least initially flows generally parallel to the first and second gases. If desired as shown, heat exchanging fluid may also flow from a fourth side 29 between the first 25 and second 26 sides where inlets from a plenum may be provided, to the opposite third side 27, in passages provided between the lower (as shown) second sinusoidal interconnect 21 and the lower cover 39. Thus the heat exchanging fluid also flows generally parallel to the oxygen gas. Whether the heat exchanging fluid is arranged to flow in one direction or two directions, the fluid in this example is separate from each of the first, second and third gas flows.

In another arrangement (not shown) where it is desired to produce a product gas which is substantially oxygen depleted, i.e. pure oxygen is not required to be produced, if desired, the fourth flow path 36a, 36b for the heat exchanging fluid may be coincident with the third gas flow path 24, i.e. cool or hot heat exchanging fluid as desired, may be fed into the passages of the third gas flow path 24, as well as or instead of through the other passageways, which will have the effect of diluting the oxygen, but also of cooling/heating the device 10.

Figure 2:
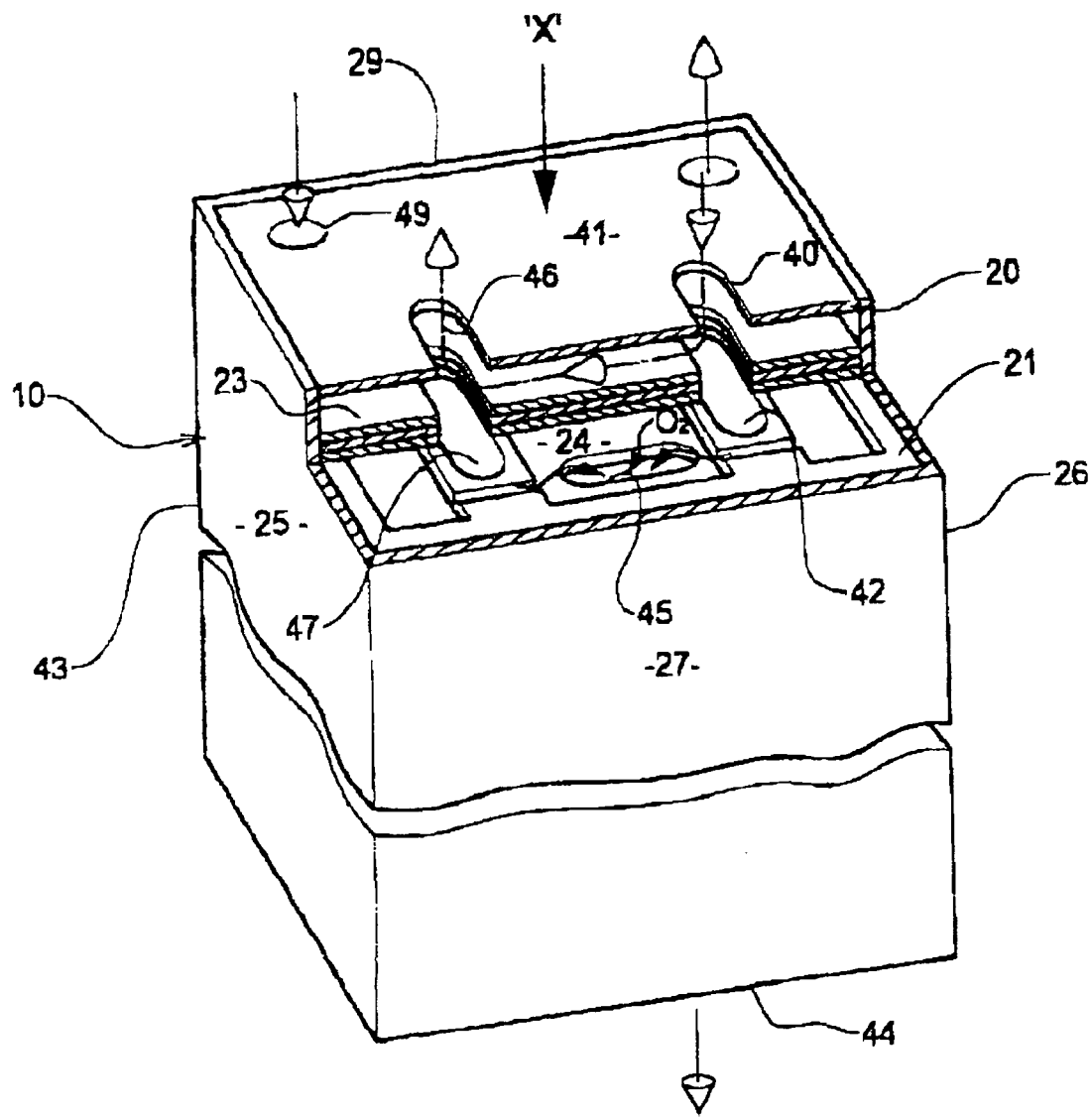
FIG. 2 is an illustrative view, with part removed for clarity, of a second embodiment of an ionic conduction device in accordance with the present invention.
Figure 3:
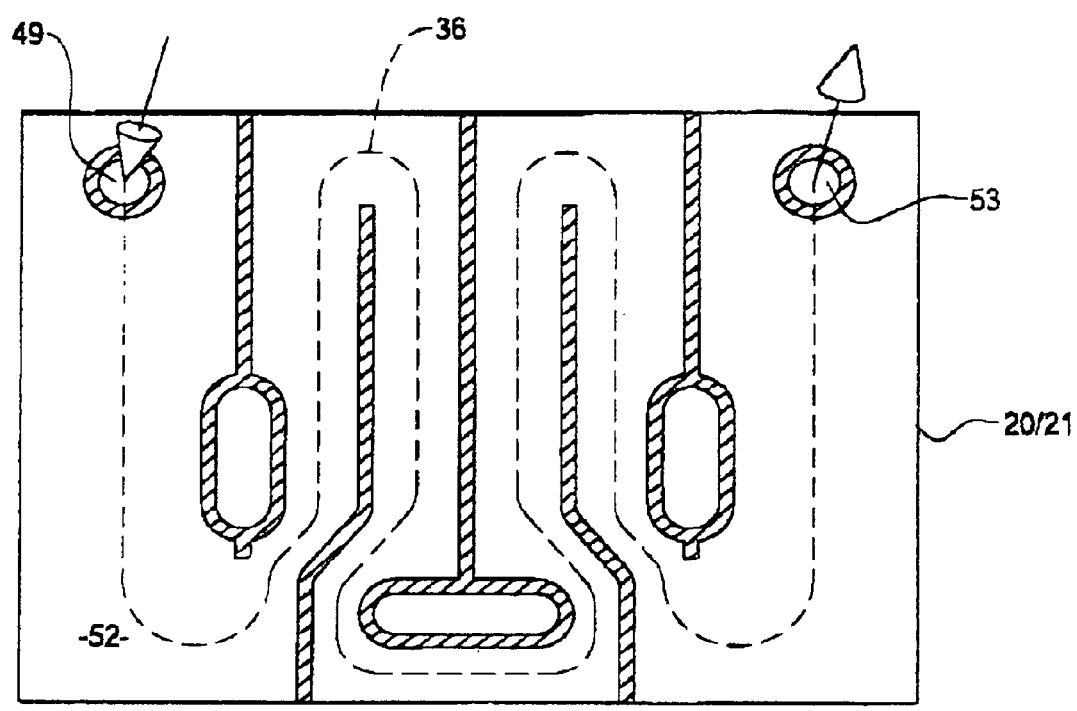
FIG. 3 is an end cross sectional view of the embodiment of FIG. 2 in the direction of the arrow X.

Referring now to FIGS. 2 and 3, an other embodiment of an ionic conduction device is shown, with similar parts to the device of FIG. 1 being indicated with the same reference indicae.

In the FIGS. 2 and 3 device, the need far plenums at the sides 25, 26, 27 of the device 10 are avoided. The first gas, i.e. air, is introduced into the device by an air inlet port 40 provided at one end 41 of the device 10. The device 10 includes a plurality of tri-layers 11 separated by interconnects 20, 21 across which an electrical potential is established, arranged in a stack 43, and the air after passing through the air inlet port 40, either passes further down the stack 43 through a passageway 42 or flows along a first gas flow path 22 across one of the opposed surfaces 13 of the membrane of the first tri-layer 11 of the stack 43. In this example, the uppermost interconnect 20 provides an end cover for the device 10. Oxygen passes through the tri-layer 11 into a third fluid flow path on the other opposed surface 14 of the tri-layer 11 and hence into a passageway 45 down through the stack 43 where other oxygen, from others of the tri-layers 11 joins the oxygen from the first tri-layer 11, and the oxygen flows to an opposite end of the stack to an outlet port 44, from where the oxygen may be removed for use.

The air which flows in the first gas flow path 22 thus becomes depleted with oxygen, and the first flow path 22 becomes the second flow path 23 from where the oxygen depleted gas flows to an outlet port 46 at the first end 41 of the stack 43.

The oxygen depleted air at the outlet port 46 is joined by further oxygen depleted air from lower down in the stack 43, via a passageway 47 which extends through the upper tri-layer 11, to other tri-layers beneath.

The stack 43 may have any desired number of tri-layers 11, although in the example, only two are shown.

In accordance with the invention, a fourth flow path 36 for heat exchanging fluid is provided, which extends from an inlet port 49 in the upper end 41 of the stack 43, into passages formed in or by one of, or more than one of, the interconnects 20, 21. As can be seen from FIG. 3, the passages of the fourth flow path 36 may form a labyrinth 52 along which the heat exchanging fluid is constrained to flow, thus removing or imparting heat to the device 10 to cool or beat the device 10 as desired. The inlet port 49 to the fourth flow path 36 may extend down through the stack 43 and deliver heat exchanging fluid to labyrinth passages 52 in others of the interconnects of the stack, and the heat exchanging fluid, after passing along the or each of the labyrinth passages 52, flow to an outlet port 53 which is again provided at the one end 4-1 of the stack 43 and may be connected to fourth flow paths of other tri-layers. lower down in the stack 43.

In each of the embodiments described where the heat exchanging fluid is a coolant, for example to cool the device 10, the coolant may be cooled by conditioning. Where the coolant fluid is air, this may be cooled by being expanded in an air or vapor cycle air conditioning machine, to which the coolant may be recirculated after being used to cool the device 10 as described.

Where the heat exchanging fluid is a hot fluid for heating the device, the fluid may be heated exteriorly of the device 10 in a heater and recirculated to the beater after heating the device 10.

Various modifications may be made without departing from the scope of the invention.

For example the invention has been described in relation to ionic conduction devices used for separating gases from a gas mixture, but may be used for a fuel cell. In that case, the first gas may be a gaseous fuel such as hydrogen, arid second gas may be oxygen, and the third gas may be exhaust gas, with the first and second gases both flowing through flow paths across one surface of the or each tri-layer, and the exhaust gas flowing though a flow path across the opposed surface of the tri-layer or layers 11, thus producing electrical energy which is removed from the device 10 through the interconnects 20, 21.

The invention claimed is:

1. An ionic conduction device for separating air into oxygen rich gas and oxygen depleted gas, the device being of the kind including at least one tri-layer including an electrolytic membrane having two opposed surfaces, a first gas permeable electrode in contact with one of the opposed surfaces and a second gas permeable electrode in contact with the other of the opposed surfaces, the device including an inlet for air at a first side of the device and a plurality of generally parallel first gas flow passages for the air extending across said first electrode between the first side of the device and a second opposite side of the device, wherein air in said first gas flow passages is in contact with said first electrode and oxygen from such air passes through said first electrodes, the membrane and the second electrode into a plurality of generally parallel second gas flow passages which extend across said second electrode between a third side of the device where the oxygen rich gas is collected and a fourth side opposite to the third side, the oxygen depleted air in the first passages continuing to flow to an outlet at the second side of the device, wherein said second passages are not parallel to said first passages, and including a flow path through the device between at least one of the first and second sides of the device and between the third and fourth sides of the device for bringing a heat exchange fluid into heat exchange relationship with said tri-layer without direct fluid contact with said tri-layer.

2. A device according to claim 1 wherein there are a plurality of flow paths for heat exchange fluid between the first and second sides of the device with a flow passage for heat exchange fluid located between and parallel to each adjacent pair of the first gas flow passages.

3. A device according to claim 1 wherein there are a plurality of flow paths for heat exchange fluid between the third and fourth sides of the device with a flow passage for heat exchange fluid located between and parallel to each adjacent pair of the second flow passages.

4. A device according to claim 1 wherein there are a plurality of flow paths for heat exchange fluid between the first and second sides of the device with a flow passage for heat exchange fluid located between and parallel to each adjacent pair of the first gas flow passages, and wherein there are a plurality of flow paths for heat exchange fluid between the third and fourth sides of the device with a flow passage for heat exchange fluid located between and parallel to each adjacent pair of the second flow passages, whereby heat exchange fluid controls the temperature of both sides of the tri-layer.

5. A device according to claim 2, and wherein the second passages are perpendicular to the first passages.

6. A device according to claim 3, and wherein the second passages are perpendicular to the first passages.

7. A device according to claim 4, and wherein the second passages are perpendicular to the first passages.

* * * * *